Patented Feb. 1, 1949

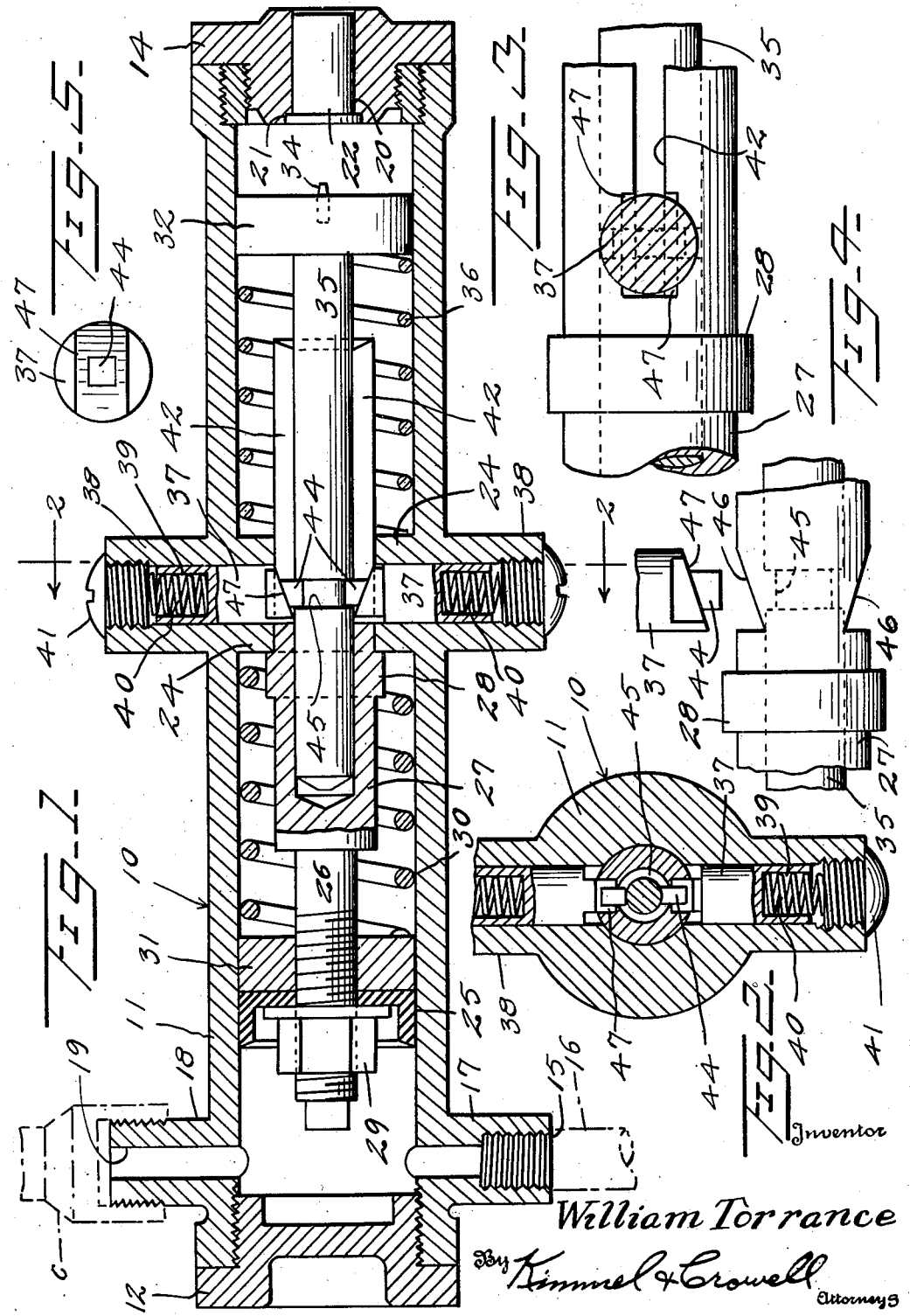

2,460,315

UNITED STATES PATENT OFFICE 2,460,315

TIRE PRESSURE ALARM

William Torrance, Calgary, Alberta, Canada

Application July 14, 1947, Serial No. 760,735

4 Claims. (Cl. 116—34)

This invention relates to tire pressure alarms and more particularly to a cartridge detonating device operable for firing a cartridge when the pressure in the tire falls below a predetermined value.

It is an object of this invention to provide a tire pressure alarm of the kind to be more particularly described hereinafter which may be readily attached to the tire and carried by the wheel. By its construction the device may be used on various sized tires with the use of suitable adapter fittings and may be readily adjusted for operation at selected tire pressures.

Another object of this invention is to provide a tire alarm of this kind which is formed of relatively few moving parts to provide a highly efficient alarm, and so constructed and arranged that it may be maintained and adjusted with the minimum of labor and time.

A further object of this invention is to provide an alarm of this kind having a spring-pressed firing pin which is held in place by a pair of retaining lugs and in which the retaining lugs are moved to pin releasing position by the sliding movement of a pressure responsive piston connected to the tire.

Still another object of this invention is to provide a reliable device of this kind which may be readily manufactured and assembled at a low cost and with a minimum expenditure of time and labor and which is easily installed and operated.

With the above and other objects in view, my invention consists in the arrangement, combination and details of construction disclosed in the drawings and specification, and then more particularly pointed out in the appended claims.

In the drawings,

Figure 1 is a longitudinal section taken through a tire pressure alarm constructed according to an embodiment of this invention, Figure 2 is a transverse section, partly broken away, taken on the line 2—2 of Figure 1, Figure 3 is a top plan view, partly broken away and partly in section, showing the relationship of the slidably connected piston shafts and the retaining pin, Figure 4 is a side elevation, partly broken away, of the sliding shafts showing the retaining pin in the released position; and Figure 5 is a bottom plan view of the retaining pin removed from the assembly.

Referring to the drawing, the numeral 10 designates generally a tire pressure alarm which is constructed for firing a cartridge when the pressure in the truck or automobile tire has fallen below a predetermined value. The tire pressure alarm 10 is formed with an enlongated tubular housing or body 11 which is adapted to be connected at one end to the stem of a tube or tire so that the air pressure in the tube may be translated into the housing or body 11.

The body 11 is open at both ends and provided with screw plugs 12 and 14 for closing the ends of the tube. An inlet port 15 is provided at one end of the housing 11 adjacent the plug 12 to which the stem 16 of the tube is adapted to be attached. The opening 15 is provided through a radially extended boss 17 on the body 11. A boss 18 is provided on the opposite side of the end of the housing 11 diametrically opposite from the inlet port 15. The boss 18 is formed with an opening 19 therethrough.

A valve connector C is adapted to be connected to the boss 18 for releasing air from the tire without removing the alarm from the tire. The opposite end of the body 11 is closed with a nut 14 which is formed with a bore 20 therethrough having an enlarged recess 21 at the inner end thereof in which a cartridge 22 is adapted to be frictionally engaged. The nut 14 may be readily removed for changing the cartridge after it has been shot.

An annular bead or rib 24 is provided internally of the body 11 midway the length thereof. A piston 25 is slidably disposed in the body 11 between the rib 24 and the inlet end of the housing. The piston 25 is threadably engaged about the reduced diameter end 26 of a tubular shaft 27. The enlarged end of the tubular shaft 27 is slidably engaged or journaled in the rib 24 and is limited in its sliding motion in one direction by a slightly enlarged rib 28 about the shaft 27 which is adapted to abuttingly engage the inner end of the rib 24.

The piston 25 is preferably cup-shaped, as shown in Figure 1, and the piston 25 is secured on the shaft 26 by a nut 29. A spring 30 is engaged in the housing 11 about the shaft 27 and abuts at one end the rib 24 and at the other end the outer surface of a spacer 31 between the inner end of the spring 30 and the piston cup 25. The piston 25 is adapted to be moved outwardly toward the rib 24 by the air pressure entering through the opening 15. The spring 30 constantly urges the piston 25 inwardly against the air pressure and the tension of the spring 30 may be adjusted by moving the location of the nut 29 and piston 25 along the length of the reduced end 26 of the shaft 27. In this manner the tire pressure alarm 10 may be adjusted for different tire pressures and for various sized tires.

A second piston 32 is slidably disposed in the other end of the body 11 adjacent the cartridge 22. A firing pin 34 is fixed to or carried by the outer end of the piston 32 and is adapted to detonate the cartridge 22 when the piston is sharply forced towards that end. A rod 35 is connected to the inner end of the piston 32 and is adapted to slidingly engage within the hollow end of the tubular shaft 27.

A spring 36 engaging at its inner end against the outer side of the rib 24 engages the inner side of the piston 32 for constantly biasing the piston to the cartridge detonating position.

For holding the piston 32 and firing pin 34 in the cocked position a pair of oppositely disposed retaining pins 37 are slidably carried in the body 11 and extend through the rib 24. Tubular bosses 38 are provided on opposite sides of the housing 11 outwardly of the rib 24 within which the pins 37 are slidable. The pins 37 are cylindrical throughout the greater portion of their length and formed at the outer end thereof with a counterbore 39. A spring 40 is disposed in the counterbore 39 and abuts at its upper end the inner end of an adjusting screw 41. The screw 41 is threadably engaged in the boss 38 for adjusting the tension on the retaining pins 37.

The retaining pins 37 in order to operatively engage the rod 35 on which the piston 32 is connected must extend through the tubular shaft 27. To provide for this movement the shaft 27 is formed with longitudinally extending slots 42 on opposite sides thereof at its outer end. A downwardly extending rectangular lug 44 is fixed to or formed on the lower end of the retaining pin 37. The lug 44 is adapted to freely engage through the slots 42 of the shaft 27 and engage retainingly in an annular groove 45 formed on the shaft 35 intermediate its length.

When the lug 44 is engaged in the groove 45 the piston 32 is held in the cocked position, with the spring 36 exerting a pressure outwardly. For raising the retaining pins 37 from their retaining position, correlated cams are formed on the lower end of the pins 37 and on the slotted shaft 27.

A downwardly and inwardly inclined surface 46 is formed on the shaft 27 at the inner end of the slot 42. The surface 46 is formed on both sides of the slot and provides a moving cam on the shaft 27. A correlated cam surface 47 is formed on the lower end of the retaining pin 37 at the upper end of the lug 44. The cam surface 47 extends outwardly of the lug 44 and is disposed in an outwardly and upwardly inclined direction.

In the use and operation of the tire pressure alarm 10, when sufficient pressure is in the tire the piston 25 will be moved outwardly against the tension of the spring 30 until the rib 28 is in engagement with the rib 24. In this position the piston 32 may be pressed inwardly against the tension of the spring 36 until the retaining pins 37 are in engagement with the shaft 35.

The lugs 44 at this time will be engaged in the annular groove 45 for retaining the piston 32 in this position. The plug 14 may then be installed on the outer end of the body 11, having a cartridge 22. As the tire pressure decreases below the tension of the spring 30, the piston 25 and the shaft 27 will be moved inwardly. As the shaft 27 moves the cam surface 46 will engage the cam surface 47 for raising the pins 37 against the tension of the springs 40. Upon sufficient movement of the shaft 27 inwardly the lugs 44 will be raised out of the groove 45. At this time the spring 36 will move the piston 32 sharply to the right as viewed in Figure 1, causing the firing pin 34 to detonate the cartridge 22. The sound of the exploding cartridge will indicate to the driver of the truck or automobile that the tire pressure in one of the tires has decreased below a safe point and he may take the necessary precautions.

I do not mean to confine myself to the exact details of construction herein disclosed, but claim all variations falling within the purview of the appended claims.

What I claim is:

1. A tire pressure alarm comprising a tubular body, a piston slidable in one end of said body, a tubular shaft carried by said piston and extending longitudinally of said body, said body formed at said one end with an air inlet opening for attachment to a tire, said shaft formed with a longitudinal slot therethrough at the end opposite from said piston, a spring-pressed retaining pin carried by said body radially thereof and extending through said slot, a second piston slidable in said body at the other end thereof, a rod on said second piston slidable in said tubular shaft, said rod formed with an annular recess in which said pin is engageable, means supporting a cartridge in said other end of said body, a firing pin on said second piston, spring means biasing said pistons toward their respective ends of said housing, and correlated cam means carried by said shaft and said retaining pin for disengaging said pin from said rod upon sliding of said shaft, whereupon said cartridge may be fired upon decrease of tire pressure.

2. A tire pressure alarm comprising a tubular body, an internal annular rib in said body intermediate the length thereof, a piston slidable in said body on one side of said rib, a tubular shaft on said piston journaled in said rib, a spring about said shaft between said rib and said piston, said cylinder formed with an air inlet for admitting air under pressure to press said piston against the spring tension, a second piston slidable in said body on the opposite side of said rib, a rod on said latter piston slidable in said shaft, a firing pin on said latter piston, a spring about said rod between said latter piston and said rib, means supporting a cartridge in said body for detonation by said firing pin, said shaft formed with a longitudinal elongated slot at the end opposite from said piston, said rod formed with a peripheral groove intermediate the length thereof, opposed spring-pressed retaining pins carried by said body engageable through said slot and in said groove for retaining said rod against the spring tension, and correlated cams carried by said shaft and retaining pins for raising said pins from said groove upon a decrease of air pressure against said first piston, whereupon said latter piston and said firing pin are slid sharply toward said cartridge.

3. A tire pressure alarm comprising a tubular body, means removably supporting a cartridge at one end of said body, a pair of oppositely disposed pistons slidable in said body, spring means biasing said pistons toward the opposite ends of said body, a firing pin on one of said pistons for detonating said cartridge, said body formed with an air inlet at the other end whereby air pressure may hold the other piston against the spring tension, a recessed rod on said one piston, a slotted shaft on said other piston about said rod, spring-pressed radially disposed retaining pins in said body engaging in said recessed rod for restraining said first piston against spring tension, and correlated cam means carried by said shaft and said restraining pins for releasing said pins from said rod upon a decrease of pressure on said latter piston.

4. A tire pressure alarm comprising a tubular body, means removably supporting a cartridge at one end of said body, a pair of oppositely disposed pistons slidable in said body, spring means biasing said pistons toward opposite ends of said body, a firing pin on one of said pistons for detonating said cartridge, said body formed with an air inlet at the other end whereby air pressure may hold the other piston against the spring tension, a longitudinally slotted tubular shaft on said other piston formed with a cam surface at one end of said slot, a rod on said one piston formed with a peripheral recess intermediate the length thereof, said rod slidable in said shaft, spring pressed retaining pins radially slidable in said body, each of said pins including a lower cam surface engageable with the cam of said shaft and with said shaft on opposite sides of the slot therein and a locking lug extending beyond the cam of said pin slidable in said slot and engageable in the recess of said rod for restraining said first piston against the spring tension, said lug releasable from said recessed rod upon sliding of said shaft upon decrease of air pressure acting against said other piston whereby said firing pin will strike the cartridge.

WILLIAM TORRANCE.

REFERENCES CITED

The following references are of record in the file of this patent:

UNITED STATES PATENTS

| Number | Name | Date |
|---|---|---|
| 1,061,184 | Knies | May 6, 1913 |
| 1,367,490 | Michelin | Feb. 1, 1921 |
| 1,368,927 | Harris | Feb. 15, 1921 |

FOREIGN PATENTS

| Number | Country | Date |
|---|---|---|
| 694,743 | France | Sept. 22, 1930 |